United States Patent Office 3,144,342
Patented Aug. 11, 1964

3,144,342
PRESERVATION OF EGGS
Charles P. Collier, 3939 Camellia Lane, Santa Barbara, Calif., and John E. W. McConnell, 1057 Driftwood Lane, Ventura, Calif., assignors of one-third to Edward B. Gregg, San Francisco, Calif.
No Drawing. Filed July 2, 1959, Ser. No. 824,460
5 Claims. (Cl. 99—161)

This invention relates to the preservation of eggs. It relates more particularly to the preservation of eggs in the shell (hereinafter referred to as "shell eggs") but it is also applicable to dehydrated eggs, to fresh whole eggs separated from the shell and to other egg products.

This application is a continuation-in-part of our copending application Serial No. 551,257, entitled "Method of Sterilization," filed December 6, 1955, now Patent No. 3,042,533.

The problem of preserving shell eggs has received attention for many years. Fresh eggs, even those which come from the most sanitary poultry farms, are subject to rapid deterioration. This deterioration results in downgrading the eggs even before they have become unfit for human consumption. Downgrading is accompanied by substantial price reduction of the eggs. It is, therefore, important that fresh eggs maintain their fresh qualities as long as possible.

Several factors cause deterioration of shell eggs, an important factor being the entry of bacteria or other microorganisms from outside of the shell through the pores of the shell to the interior of the egg. Such microorganisms cause proteolysis and other adverse changes in the egg, particularly the albumen.

Heretofore it has been proposed to preserve shell eggs by one or a combination of means such as refrigeration, sandblasting, a water wash with or without an added bactericidal component, coating the shells of eggs with a sterile mineral oil, and the application of heat.

Each of these methods has one or more serious disadvantages. Thus refrigeration is expensive. Sandblasting acts to remove only superficial or gross impurities. It is effective to clean eggs in the sense of removing visible dirt and discoloration provided the eggs are not excessively dirty to begin with, but it does not remove microorganisms effectively.

A water wash may have the opposite effect of that intended; that is, it may serve to spread infectious organisms from the infected eggs to uninfected eggs, and it may also serve to carry microorganisms from the exterior to the interior portions of egg shells.

Mineral oil is not itself effective to eradicate microorganisms unless it is applied hot. (The disadvantages of heat will be explained shortly.) In the application of a coat of mineral oil, if the eggs have been previously sterilized by some other means, a sterile coating or film of mineral oil will retard reinfection, but the mineral oil will not itself sterilize egg shells unless it is applied with a sufficient degree of heat.

The use of heat, whether it is applied in the form of a hot mineral oil or otherwise, is difficult because of the difficult balance between a degree of heat and a time of exposure which suffice to destroy heat resistant microorganisms, and the tendency of heat to coagulate the albumen in eggs.

It is an object of the present invention to improve upon the preservation and sterilization of eggs.

It is a further object of the invention to provide a means of preserving eggs which is effective to kill microorganisms on the shells of eggs without spreading infection and without causing deterioration of the eggs.

The above and other objects of the invention will be apparent from the ensuing description and the appended claims.

As will appear, the invention is applicable not only to shell eggs but also to dried eggs, to whole fresh eggs separated from the shell and to other egg products.

In our copending application Serial No. 551,257, there is described and claimed a method of sterilizing food, food products, ingredients of food, food containers, covers and the like by means of an epoxide such as propylene oxide or ethylene oxide. As described in said application the effectiveness of epoxides for this purpose is greatly enhanced by employing the epoxide in vapor or gaseous form in admixture with water vapor. By such means it is possible to effect sterilization at temperatures less than 212° F. and with times of contact not exceeding a few minutes. It is this low temperature-short time feature which makes the invention of our copending application attractive to canners.

The time element is not as important in sterilizing eggs as in the canning of food, from the standpoint of production rates. In food canning it is necessary to supply food, cans and covers at very high speed to fillers and closing machines, and if the sterilizing step requires a considerable length of time, e.g., 20–30 minutes, the cost of canning is increased very substantially. In sterilizing eggs the time factor is not as important from the production standpoint but it is very important in heat sterilization from the standpoint of egg deterioration. Thus the albumen of shell eggs should be stabilized, i.e., proteolytic enzymes should be inhibited, but the time and temperature of exposure are limited by the coagulating effect of heat on albumen. An exposure of about 8 minutes at about 134° F., or an exposure of a few seconds at 212° F., to steam or water will reduce the bacteria count considerably without deterioration, but it has little effect on the more heat resistant organisms. It can be said that heat alone is insufficient.

Therefore, it is apparent that a process which sterilizes egg shells without overexposure to heat, and without the disadvantages of a sterile water wash, would be highly desirable.

We have discovered that the epoxide-water vapor process of our copending application is excellently adapted to this purpose. That is, an epoxide-water vapor mixture, used in accordance with our invention, will sterilize egg shells without spreading infection and will kill all spoilage microorganisms; and it will do so at a time and temperature which do not cause coagulation of albumen.

More specifically we have found that epoxide-water vapor mixtures of our invention will kill even very heat resistant spores of B. subtilis at temperatures as low as 130° F. and in short time, e.g., 36 minutes at 130° F. or 12 seconds at 212° F. B. subtilis is representative of the most heat resistant spoilage organisms which contaminate eggs. Exposure to heat and water vapor alone would require exposure periods many times longer to kill this organism. When it is considered that complete sterilization is not as important in the processing of eggs as in the canning of food, it will be apparent that our invention makes it possible to increase greatly the shelf life (i.e., to preserve) shell eggs without deterioration of the eggs and without the danger of spreading infection.

In applying the present invention to shell eggs the shell eggs may be submitted to a precleaning step, for example, sandblasting to remove some or all of the gross impurities, adhering dirt, stains, etc. Also, the shell eggs may be prewashed with an aqueous washing medium, and our present invention has a special advantage in this connection. Ordinarily such a wash would spread infection and if followed by a drying period it would carry microorganisms into the interior of the eggs. However, if such a wash is followed quickly by an epoxide-water vapor treatment in accordance with our invention the infectious microorganisms on the surface of eggs will be killed.

Following epoxide-water vapor treatment in accordance with our invention, shell eggs are preferably packaged in sterile, airtight containers or are coated with a sterile coating, as by dipping in or spraying with a sterile mineral oil. It will be understood that our epoxide treatment is effective to kill microorganisms on the shells of eggs but that its beneficial effect will be diminished if, subsequent to the treatment, the eggs are exposed to a nonsterile atmosphere, to contact with nonsterile containers or equipment, or to contact with the hands of operators. Our epoxide-water vapor treatment, even if used along without subsequent sterile packaging or sterile coating, will prolong the shelf life of shell eggs but it is preferred to follow our sterilizing step with sterile packaging or coating with a sterile mineral oil.

The preferred epoxides are ethylene oxide and propylene oxide which have the following structural formulae:

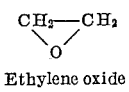 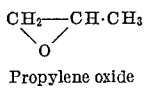

Ethylene oxide    Propylene oxide

However, higher homologues may be used, such as isobutylene oxide,

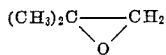

and derivatives such as styrene oxide

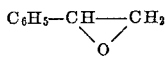

Also, isomers may be employed, in which a four-membered oxy ring replaces the three-membered oxy ring. Also such compounds as epichlorhydrin, ethylene imine and ethylene sulfide may be used which have the characteristic heterocyclic ring nucleus

wherein X is oxygen, nitrogen or sulphur. Preferably, an epoxide or the like is used which boils below 212° F., or which at least has a substantial vapor pressure at 212° F.

Generally stated the sterilizing media of our invention consist of gaseous mixtures of (1) water vapor and (2) the vapor of a compound having the formula

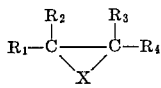

wherein X is selected from the group consisting of oxygen, sulfur and the imine (NH) radical and $R_1$, $R_2$, $R_3$ and $R_4$ are selected from the group consisting of hydrogen and low molecular weight hydrocarbon radicals, such compound having a substantial vapor pressure at 212° F.

The proportions of epoxide and water or water vapor may vary widely. Thus, ethylene oxide-water vapor mixtures varying from 10% ethylene oxide and 90% water vapor to 95% ethylene oxide and 5% water vapor have been employed for sterilization and have been found to be effective. Likewise, propylene oxide-water vapor mixtures varying from 40% propylene oxide and 60% water to 98% propylene oxide and 2% water vapor have been employed effectively for sterilization.

It is an important advantage of the media of the invention that they effect sterilization at relatively low temperatures, e.g., 212° F. or less, in relatively short periods of time of the order of a few seconds to a few minutes depending upon the temperature. By way of comparison, pure water vapor (zero percent epoxide) in the form of steam requires either high temperatures (e.g., 240–250° F.) or long exposure times (of the order of an hour or more) to destroy the more heat resistant spoilage organisms. Pure epoxide (zero percent water) likewise requires a high temperature and/or a longer exposure time. If water is present on the eggs, e.g., if they have been given a sterile water wash or rinse and the eggs have not been dried, it is feasible to use pure epoxide, by reason of the fact that epoxide-water vapor mixtures form in situ.

Shell eggs may be contacted with epoxide-water vapor mixtures by any suitable method, preferably by countercurrent contact as by causing shell eggs to pass on a continuous conveyor through a tunnel through which epoxide-water vapor mixture is passed in the opposite direction. Preferably the eggs are preheated to or close to the sterilizing temperature prior to contact with the epoxide-water vapor mixture, because we have found that epoxide vapor itself does not transfer heat as rapidly as steam. For this reason, mixtures of epoxide and water vapor which are high in water vapor are more efficient heat transfer media. Provided the egg shells are brought up to or near the sterilizing temperature before contact with the epoxide-water vapor mixture, contact times of a few seconds to about 30 minutes and temperatures (of the epoxide-water vapor mixture) of about 130° to 212° F. are suitable, the lower temperatures being used with longer exposure and vice versa.

Dried egg powder, whole fresh eggs separated from the shell and other egg products may be similarly sterilized.

Shell eggs and other egg products can be sterilized in this manner in short periods of time and at temperatures which do not result in protein coagulation or other forms of degradation caused by heat. Thus shell eggs have been subjected to an 80% propylene oxide–20% water vapor mixture for 20 minutes at 180° F., during which the outside shells of the eggs reached a temperature of 150° F. The eggs were opened two hours after exposure. No evidence of albumen coagulation was found. Also upon scrambling and cooking the eggs with margarine no off flavor was noticed. A slight medicinal odor lingers for a while after sterilization but disappears within a relatively short time, for example, within twenty-four hours during storage at 40° F.

It will, therefore, be apparent that a method has been provided of sterilizing eggs, both in the shell and out of the shell, such method having the advantage of being very effective in short periods of time and at relatively low temperatures against even heat resistant bacterial spores and avoiding disadvantages noted above in connection with other methods of preserving eggs.

We claim:

1. A method of treating a food product of the class consisting of fresh eggs in the shell, fresh whole eggs removed from the shell and other fresh egg products which are sensitive to elevated temperatures and undergo coagulation of albumen at elevated temperatures, said method comprising contacting such food product with a gaseous sterilizing medium for a time and at a temperature sufficient to kill substantially all microorganisms which are brought into contact with the medium, said medium being a mixture of substantial proportions each of water vapor and a gas of a compound which has the formula

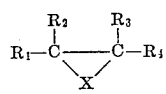

wherein $R_1$, $R_2$, $R_3$ and $R_4$ are selected from the group consisting of hydrogen and hydrocarbon radicals and in which X is selected from the group consisting of oxygen and the imine group, NH; said compound having a bactericidal effect and also having a substantial vapor pressure at 212° F.; the temperature being between about 130° F. and 212° F., the contact time being insufficient to cause such coagulation.

2. The method of claim 1 wherein the food product consists of eggs in the shell.

3. The method of claim 1 wherein said compound is ethylene oxide.

4. The method of claim 1 wherein said compound is propylene oxide.

5. A method of treating eggs in the shell to sterilize the shells which comprises subjecting the shells to a temperature of about 130 to 212° F. and to exposure to an epoxide gas containing a substantial amount of water vapor, for a time sufficient to destroy all microorganisms on the shells but insufficient to cause substantial coagulation of albumen in the eggs.

References Cited in the file of this patent

UNITED STATES PATENTS

| | | |
|---|---|---|
| 520,549 | Underwood | May 29, 1894 |
| 1,011,352 | Lescarde | Dec. 12, 1911 |
| 2,075,845 | Gross et al. | Apr. 6, 1937 |
| 2,107,697 | Griffith et al. | Feb. 8, 1938 |
| 2,229,360 | Baer | Jan. 21, 1941 |
| 2,370,768 | Baerwald | Mar. 6, 1945 |
| 2,618,216 | Mulvany | Nov. 18, 1952 |
| 2,667,421 | Parks | Jan. 26, 1954 |
| 2,891,119 | Minkler et al | June 9, 1959 |

OTHER REFERENCES

"Food Manufacturer," April 1957, pages 169 to 172, inclusive, article entitled "Ethylene Oxide for Cold Sterilization," by H. Rauscher et al.